July 22, 1958  H. B. SHERMAN  2,844,345
TRIPODS AND CLAMPS THEREFOR
Filed March 10, 1955  2 Sheets-Sheet 2
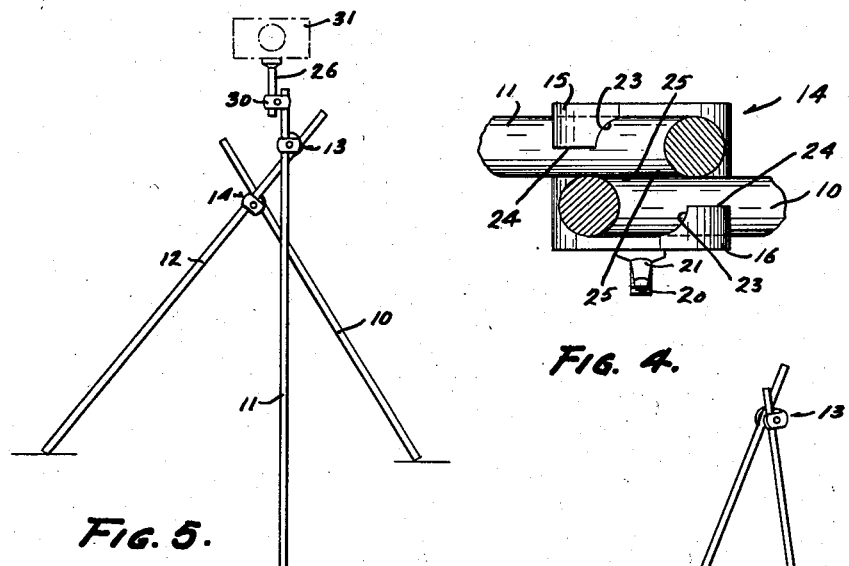
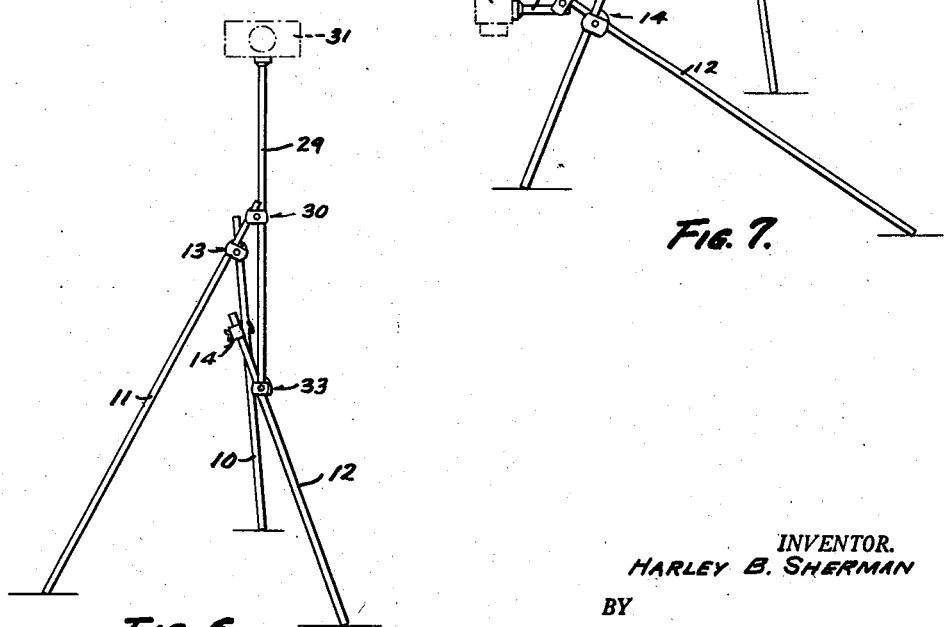
INVENTOR.
HARLEY B. SHERMAN
BY
Bean, Brooks, Buckley & Bean,
ATTORNEYS United States Patent Office 2,844,345
Patented July 22, 1958

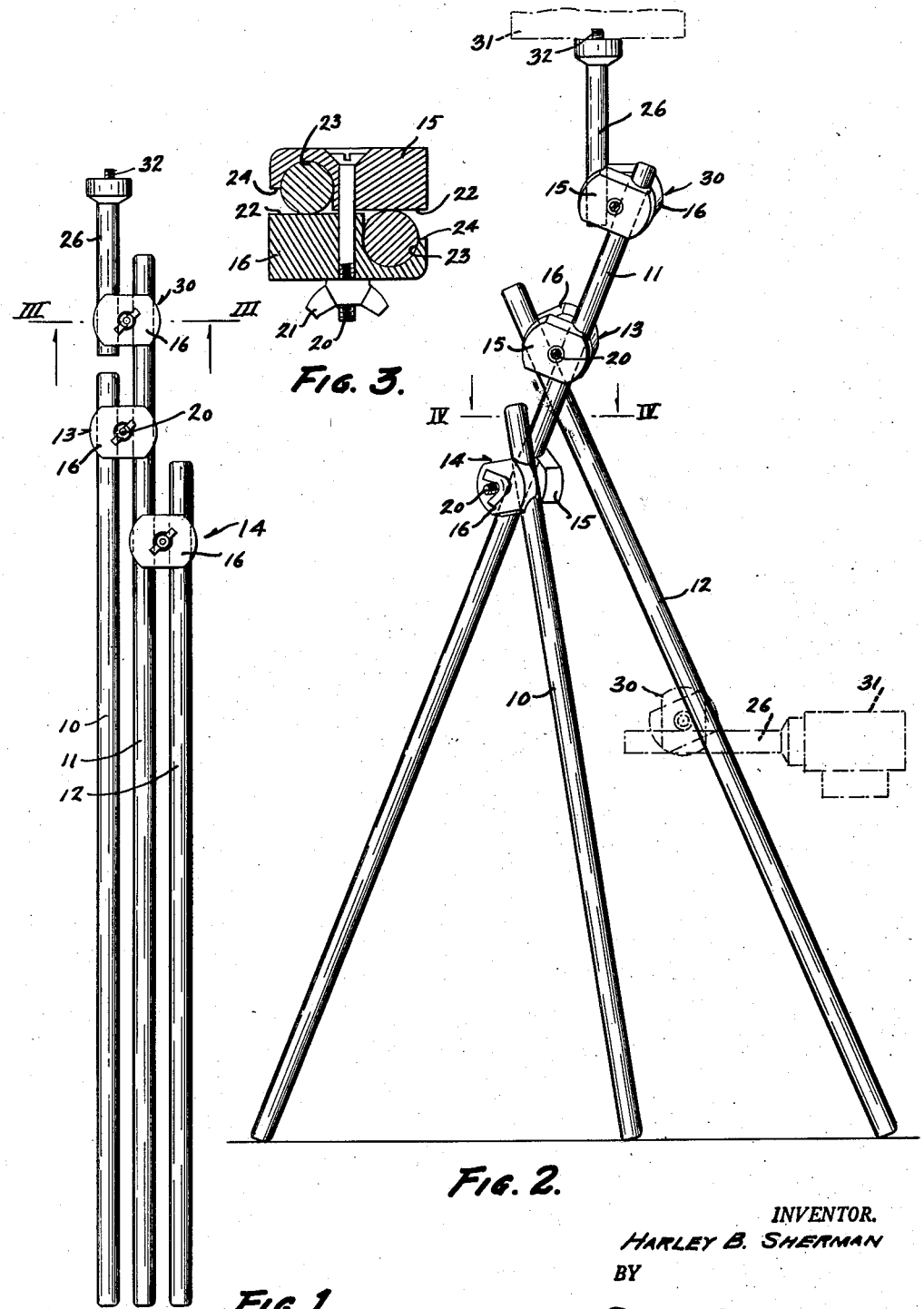

2,844,345
TRIPODS AND CLAMPS THEREFOR
Harley B. Sherman, Gainesville, Fla.
Application March 10, 1955, Serial No. 493,500
2 Claims. (Cl. 248—122)

My invention relates in general to tripods and in particular to tripods used to support a camera or other instrument.

The principal object of my invention is to provide a tripod having a plurality of separate legs held together in adjustable manner by means of a plurality of clamps in which the legs are slidably adjustable.

Another object is to provide a tripod having separate legs, one leg being common to the other two legs which are adjustably carried thereby.

A further object is to provide a tripod having a separate detachable instrument holder which may be readily attached in any desired position to either of the legs of the tripod.

A further object is to provide a clamp for adjustably securing the legs of the tripod to one another at any desired angle to the adjacent leg and at any position along the length of such leg.

Furthermore, it has been an object to provide a clamp for tripod legs having duplicate parts, each formed with a semicircular groove in its adjacent surface for the sliding reception of the engaged leg, means being provided for drawing the clamping members together to hold the tripod legs in the adjusted positions.

Moreover, the adjacent face of each of the clamping members is cut away at one side of the groove so that when the clamping screws of the cooperating clamping members are released part-way, the clamp may be removed laterally from the engaged tripod legs.

Furthermore, the groove of each clamping member is so proportioned that when the adjacent members are tightened sufficiently to hold the legs in their parallel positions, movement of adjacent legs to angular positions will bring the sides thereof into engagement with each other and cause the clamping members to further tighten the legs without having to alter the adjustment of the tightening screw.

The above objects and advantages have been accomplished by the device shown in the accompanying drawings, of which:

Fig. 1 is a side elevation of the tripod in its collapsed position;

Fig. 2 is an elevation of the tripod in one of its extended positions;

Fig. 3 is a sectional view taken on line III—III of Fig. 1;

Fig. 4 is a fragmentary sectional plan view taken on line IV—IV of Fig. 2; and

Figs. 5 to 7, inclusive, show the tripod in various positions of use.

The tripod consists of three legs 10, 11 and 12, each preferably of different length and held together by means of two clamps 13 and 14. As shown in Figs. 1 and 2, the leg 11 is common to the legs 10 and 12, and the clamping member 13 secures the leg 10 to the leg 11, whereas the clamping member 14 secures the leg 12 to the leg 11.

Each of the clamps comprise two duplicate clamping members 15 and 16 held in clamping relation by means of a clamp screw 20 having a wing nut 21 at its outer end. This screw passes through suitable apertures formed in the central portion of the clamping members and provides a pivot for each of the members whereby they may be adjusted relatively to accommodate any desired angular arrangement of the legs. Each of the clamping members is formed in its inner adjacent flat surface 22 with a semicircular groove 23 for the reception of the engaged tripod leg. As clearly illustrated in Fig. 3, the groove is located at one side of the member and the material of the clamp at the outside edge of the groove is cut away a distance equal to substantially one-half the depth of the semicircular groove, thus forming a depressed surface 24, whereby when the wing nut is partially unscrewed, one tripod leg may be withdrawn from the clamp; and, then by rotating one clamp member to bring the groove thereof in registration with the groove of the other clamp members, the clamp may be removed laterally from the other tripod leg without further unscrewing of the wing nut. As shown in this figure, the grooves are of such depth that when two engaging clamping members are tightened, the legs will be forced toward the flat ungrooved surfaces of the adjacent clamping members. As also shown in this figure there is a slight space between the flat surface 22 of the adjacent clamping members which cause the inner adjacent surfaces of the tripod legs to overlap each other slightly, whereby when the legs are separated and arranged at an angle, adjacent contacting surfaces 25 of the leg will serve to more tightly clamp the parts together without further adjustment of the wing nut 21, as clearly shown in Fig. 4.

As a part of the tripod, I provide an instrument arm 26 and a separate clamp 30 therefor. This instrument arm may be provided with a screw 32 for engagement with a camera or other instrument 31, shown by dot and dash lines. As shown in Fig. 2 by full lines, this arm may be carried by the upper end of the tripod leg 11, or it may be attached to either the tripod legs 10, 11 or 12 at any distance from the tripod supporting surface, as shown by the dot and dash arrangement in Fig. 2.

Owing to the manner of fastening the legs to each other, the tripod may be arranged in any one of a number of positions, illustrations thereof being shown in Figs. 5 to 7, inclusive. In Fig. 5 the instrument arm 26 is attached to the upper end of the tripod leg 11 in a manner similar to that shown in Fig. 2 except that, for this arrangement, the leg 12 is the common leg and has the legs 10 and 11 secured thereto. In Fig. 7, the instrument arm is shown arranged in a horizontal plane and attached to the outer end of the leg 12 which is carried by the leg 11 at a point near the tripod supporting surface. In Fig. 6, an elongated instrument arm 29 is shown which is secured to the upper end of the tripod leg 11 by means of the clamp 30, and it has its lower end preferably secured to the tripod leg 12 by means of an additional clamp 33. The instrument arm may have the usual screw 32 for attachment to a camera or the like, or it may have other suitable attachment means of a kind depending upon the instrument to be supported by the tripod.

By means of the separate individually clamped legs and coacting clamping members, it will be seen that an instrument such as a camera may be held at any desired position in a horizontal or vertical plane or in any intermediate plane therebetween. It will be obvious that the grooves of my device are so proportioned that after the clamping means are initially adjusted to clamp the legs in collapsed positions, movement of the legs to angular positions of use will tighten the clamping means sufficiently to permit the immediate use of the tripod without further adjustment of the clamping means. It is also obvious from the above that, since the legs are not hinged together, as is customary in, for instance, camera tripods, the legs may be arranged in any manner and at any related angle to position the instrument carried thereby in the most convenient and stable manner.

What is claimed is:

1. A tripod for adjustably supporting a camera, comprising three one-piece legs, a separate individual leg clamp detachably carried by each of two legs for precision independent longitudinal adjustment of said two legs upon the third leg, said leg clamps being adjustably attached to said third leg at spaced positions thereon, an attachment arm, means for securing a camera to said arm, and a separate clamp substantially similar to said leg clamps detachably carried by said arm for detachably securing said arm to a selected leg.

2. A tripod for adjustably supporting a camera, comprising three one-piece legs, a separate individual leg clamp detachably carried by each of two legs for precision independent longitudinal adjustment of said two legs upon the third leg, said clamps being attached to said third leg at spaced positions thereon, an attachment arm, means for securing a camera to said arm, a separate clamp substantially similar to said leg clamp detachably carried by said arm for detachably securing it to a selected leg, each of said clamps having two duplicate parts, each of said parts being formed on its inner face at one side of the lateral center with a groove, each of said parts being provided on its inner face with a flat surface extending from said groove to the opposite side of the part for bearing contact over its entire width with the adjacent leg, each of said grooves being of a depth substantially less than the diameter of each of said legs, the groove of each of said clamp parts fitting the engaged leg and having the material at its outer edge cut away so as to expose substantially one-half of the engaged leg, and a clamping screw passing through the parts of each clamp for adjustably holding said legs in any desired position and related angles.

References Cited in the file of this patent

UNITED STATES PATENTS

| | | |
|---|---|---|
| 94,672 | Turnbull | Sept. 7, 1869 |
| 834,357 | Bleckley | Oct. 30, 1906 |
| 1,190,502 | Anderson | July 11, 1916 |
| 1,503,344 | Baird | July 29, 1924 |
| 2,368,740 | Blomgren | Feb. 6, 1945 |
| 2,579,348 | Taylor | Dec. 18, 1951 |

FOREIGN PATENTS

| | | |
|---|---|---|
| 129,174 | Austria | July 11, 1932 |
| 252,468 | Great Britain | June 3, 1926 |
| 831,755 | France | Sept. 14, 1938 |